United States Patent Office 3,594,184
Patented July 20, 1971

3,594,184
TREATING HULL ENCLOSED COTYLEDON SEEDS
Robert L. Hawley, Webster Groves, Mo., and Jesse T. Duren, Belleville, Ill., assignors to Ralston Purina Company, St. Louis, Mo.
No Drawing. Continuation-in-part of application Ser. No. 643,781, May 12, 1967. This application Apr. 26, 1968, Ser. No. 724,327
Int. Cl. A23l *1/20*
U.S. Cl. 99—98
14 Claims

ABSTRACT OF THE DISCLOSURE

A method of and products resulting from treating hull enclosed cotyledons, especially pea or bean legumes, particularly soybeans, to remove objectionable flavor, to remove or alter physiologically objectionable sugar constituents, to alter the density and texture to provide a desirable texture, and basically to produce a full-fat edible product retaining the desirable oils, by the use of a special combination of controlled dry heating of the complete bean externally and internally, to alter the internal and external characteristics thereof, followed by controlled water treatment to further alter the altered structure. This is followed by roasting to obtain edible nut like products or roasting and grinding to obtain edible spread type products.

---

This application is a continuation-in-part of our copending application Ser. No. 643,781, filed May 12, 1967, now abandoned.

BACKGROUND OF THE INVENTION

This invention relates to the treatment of hull enclosed cotyledons, especially bean or pea legumes, particularly those having characteristics preventing or inhibiting use thereof as food, a prime example of which is soybeans, and more particularly relates to a method of chemically and physically modifying such to provide an oil or fat containing food, by rendering their flavor acceptable, rendering them physiologically compatible to the human digestive system, and rendering them texturally pleasing as food.

The present development was made largely in connection with soybeans, because of the potential nutritional value of such, the widespread availability of this legume, and the necessity for a unique method of treating such because of the significant physical and chemical problems preventing commercial practical conversion of raw soybeans into a highly desirable, full-fat food product. Hence, the invention will be explained largely with respect to soybeans. In fact, it has proven to be an extremely effective process for treating soybeans. However, the process, in the broader concept of this invention, has also been found to be effective for converting other legumes, specifically beans and peas into modified food products.

The term "complete seeds" or "complete beans" when used herein shall means beans or peas with the hulls in place enclosing the cotyledons.

The term "full-fat" when used herein refers to the characteristic of retaining desirable natural oils in the food product produced, as opposed to products from which the oil is extracted as is conventionally practiced in the industry.

Soybeans as naturally found, either as a wild bean or a cultivated bean, are not a desirable food for humans because of their flavor, density and the presence of trypsin inhibitors, hemaglutinin and stachyose. Utilization of these beans is somewhat limited because of their natural characteristics. If a normal dried soybean with hull intact is placed in warm or cold water it will hydrate, i.e. absorb water to its fullest capacity within 8 to 24 hours. The water passes through the hypocotyl, and then to the cotyledons. If the hull of a normal dried soybean is damaged, (i.e., cracked or torn) and this bean is placed in water, it will hydrate more rapidly because the water can by-pass this special flow path. However, the cotyledons will absorb moisture non-uniformly and will disintegrate. This disintegration exposes and ruptures internal cell walls, thus allowing protein, fats (i.e. oils) and sugars to be leached into the soak water. The loss of the cell contents represents a monetary loss to a soybean processor for they will be discarded with the soak water. In addition, when the soak water is so contaminated with proteins, oils and sugars, the bacterial growth during the soaking period of 8 to 24 hours is phenomenal.

It is impossible in normal consumer practice to obtain soybeans in which there are no cracked (torn) hulls or broken beans. Yet, it is desirable to soak soybeans in water and then use the soaked soybean in the development of further processed human food items. Because of the natural characteristics of soybeans, i.e., beany flavor, density, presence of tryspin inhibitors, hemaglutinin and stachyose and the soaking characteristics, the food industry has not found the soybean to be very attractive for use as a whole soybean in further processed human foods. Indeed the orientals ferment whole beans in order to render them edible.

Soybeans cannot be used to manufacture an acceptable soy nut butter according to presently known tehniques because in its natural state the soybean is too dense, the soybean hull adheres too tightly to the cotyledons to be readily removed, and the resulting product has an unpleasant "mouth feel" texture. If the soybeans are roasted, they tend to burn rather than roast like a peanut. If this roasted soybean is ground into butter, it tends to be coarse and unpalatable due to the presence of soy hulls as well as the over roasting. The hearts (hypocotyls) cannot be readily removed. Even if these items are removed, a spread made from the beans has a sandy mouth feel which can be corrected only by the addition of water. Such a product tends to spoil unless kept refrigerated, and then it may become too thick to spread. We have found that if normal field dried soybeans are treated in a certain manner, the hydration characteristics of the beans are dramatically and totally changed from the norm, that the hull can be totally and easily separated from the bean, and that the hearts (hypotcotyls) can be readily removed and separated from the cotyledons.

Soybeans thus present several particular characteristics presently preventing economical commercial conversion into edible full-fat products such as simulated nuts or soy nut spreads. In brief, firstly, dependable dehulling is extremely difficult to achieve; secondly, soybeans contain objectionable bitter flavor characteristics; thirdly, soybeans contain physiologically objectionable substances such as tri-saccharides and tetra-saccharides; fourthly, soybeans cotyledons, even after dehulling, are so extremely dense as to be texturally inedible; and fifthly, even the comminuted soybeans have a grainy or sandy mouth feel which renders them unpleasant to eat. Further, these undesirable characteristics are inter-related to the extent that efforts to overcome one frequently adversely affects efforts to overcome another. Also, efforts to overcome one or more of these characteristics frequently adversely affects efforts to retain desirable nutritional components such as the proteins or the oils, or causes disintegration of the bean. These factors are illustrative of the many complications involved which have largely prevented any significant commercial conversion and sale of soybeans or like legumes in the form of oil retaining edible simulated nuts or spreads, in spite of the common knowledge of the high potential nutritional value of the bean.

Consequently, although many proposals and even patented methods have been devised for making such food products from soybeans, and although the market is ripe for such products, each proposed method, as far as is known, has significant drawbacks preventing commercial exploitation, as is attested to by the absence of such food products in the market. Other legumes or hull enclosed cotyledons frequently present difficulties also.

A great amount of the difficulty lies in the fact that even the simplest treatment steps have largely unpredictable chemical and physical results in the item, particularly soybeans.

SUMMARY OF THE INVENTION

It is a primary object of this invention to provide a specific special sequence of treatment steps that enable soybeans and like legumes to be commercially converted from the raw complete bean to a full fat delectible food, particularly as simulated nuts or as spreads, retaining the nutritional protein and oil components, with the objectionable flavor and physiologically objectionable components removed, and having a pleasing and edible texture. Moreover, the process is subject to high production output of product, causing dependable conversion of the beans to hull free, highly desirable food.

The novel process employs controlled dry heating of the complete bean clear through to obtain a specific hull cracking characteristic and controlled chemical changes in the body of the bean to cause rapid and uniform hydration in water; to allow subsequent leaching out of certain physiologically objectionable sugars, and to alter the nature of the oils and proteins to prevent subsequent leaching out of these desirable oils and proteins. This is preferably followed directly by controlled water treatment to cause dehulling and removal of the hypocotyls, regulated cotyledon swelling and expansion, and osmotic leaching out of objectionable substances, without disintegration of the cotyledon or loss of proteins or desired oils. This is followed by roasting of the swollen cotyledons in a manner to retain the texture thereof and render them attractive.

Several other objects of this invention will become apparent to those in the art upon studying this disclosure.

DESCRIPTION OF THE PREFERRED EMBODIMENTS

The inventors herein have found particular treatment steps that will produce the long sought, full-fat food product from soybeans, enabling rapid, relatively simple dependable dehulling without causing the bean to distintegrate, causing rapid hydration and swelling, enabling removal of objectionable flavor characteristics, and allowing removal of physiologically objectionable substances, yet without loss of the nutritionally valuable proteins and oils, effecting a desirable texture to the product to render it attractive as a simulated nut or as a spread, causing it to be receptive to various flavor additions for adaptation to the ultimate product, and causing other related results which render the process commercially practical to produce an economical, highly desirable food product.

One important facet of the process is the treatment of the beans in a manner allowing subsequent water treatment without disintegration of the beans and with leaching out of undesirable constituents but not of desirable constituents. According to the process herein, heating the complete seeds, i.e. with the hulls enclosing the cotyledons, is done by using dry heat. It is realized that patents have issued in recent years that teach of using dry heat to dehull soybeans to prepare the beans for extraction of the oil and use of the remaining meal for animal feed or the like. In practicing these prior processes, it is taught to be important that only the hull is to be heated, to avoid adverse effects on the subsequently extracted oil and to cause proper hull removal, and then the hulls must be cooled to allow them to be broken off and the oil extracted. The problems are significantly different when the beans are to be used as fat or oil containing human foods and not for oil extraction.

In the present process, where fat containing food products are to be prepared, and where the product texture must be acceptable to humans, it has been found by the inventors that the bean must be heated to an elevated temperature both internally and externally, i.e. heated clear through to an extent to essentially modify the internal seed structure, including the proteins and oils. Careful analysis and experimentation have shown that this causes several changes to occur, physically and chemically, in preparation for the water treatment. These changes are advantageous for dehulling, and preparation of the item as a food.

The dry heating can be conducted with heated air, or with heated gases such as combustion gases. Preferably, the beans are dry heat treated such as in a combustion flame, i.e. in heated combustion gases during actual combustion. This not only splits the hull but also partially consumes the hulls.

Experimentation with the dry heating step indicates that the chief criterion to obtain the necessary results is heat input rather than specific time or temperature. The temperature of the ambient hot gases, e.g. hot air or flame combustion gases, may vary from about 175° F. to about 500° F., with the time required being greater for the lower than the higher temperatures. The time for the low temperature is up to about 60 minutes or so, while that for the high temperatures is about 10 seconds or so. The preferred temperature range is about 250°–450° F., with the respective time range being about 10 minutes to about 25 seconds. Although the heat input is believed the controlling criterion, the exact B.t.u. input is extremely difficult to exactly determine for each bean. Also, although the accurate temperature of the center of the bean is extremely difficult to determine, as closely as can be determined, it is believed that a mean interior bean temperature of about 160° F. to 250° F. should be achieved and maintained for a time sufficient to obtain the necessary heat input for causing the important internal as well as external changes in the complete bean.

One effect of this controlled dry heating of the complete bean is to cause the hull to split perpendicular to the long axis of the cotyledons. In the subsequent water treatment, this allows easy hull removal and also rapid moisture entry and hydration of the cotyledons in minutes, i.e. about 15–20 minutes in hot water, rather than requiring many hours when hydrating the cotyledons naturally through the hypocotyl. Yet this rapid hydration will occur without disintegration of the cotyledons or significant loss of proteins or desired oils, because the heat treatment causes internal molecular changes in the beam which prevent this. A full technical explanation of these changes is not known. The oils are apparently rendered stable to osmotic leaching. The proteins are apparently rendered insoluble by being denatured. The hull splitting also causes hull removal to be simple and complete in the subsequent step. Further, this thorough heat treating step also causes some improvement in flavor.

After the complete beans are heated thusly, they are immersed in water, preferably while the beans are still hot. By gently agitating the water and beans, the hulls are readily released from and fall off the cotyledons. By slightly more vigorous agitation or rubbing, the hypocotyls are also released from the cotyledons, to allow their removal with the hulls. This is desirable because the hypocotyls are a source of bitter unsaturated oils, and because their removal extends the shelf life of the product considerably. Also, the cotyledons rapidly and uniformly absorb moisture, without disintegrating, causing swelling and expansion of the high density cotyledons to a size 2–3 times the original, with a density of only ⅓–½ of the original. This swelling and expansion causes the cell structure to expand and open. This is very significant to the texture of the final product. It is also significant in facilitating osmotic extraction or leaching out of constituents causing bitter flavor and objectionable tri- and tetra-saccharides such as tri-saccharide manninotriose and stachyose which would otherwise produce flatus in the consumer.

The water treatment may vary somewhat depending upon the final product characteristics desired. If the final product is to be roasted nut without other added flavor, it is desirable to remove much of the tri- and tetra-saccharides because of flatus production, but to retain some of the unobjectionable mono- and di-saccharides to allow proper roasting to a golden color. In this case, the water treatment may constitute water soak. This soak allows dehulling, cotyledon swelling, and significant removal of bitter flavor causing constituents. If one desires to add other sugars to the water treated items, as by soaking in a sugar solution, to obtain optimum roasting characteristics, the water treatment may comprise a water soak, followed by cooking in water to remove most of the natural sugars including the objectionable tri- and tetra-saccharides, but also the unobjectionable mono- and di-saccharides. This cooking step is advantageous in more effectively removing bitter flavor causing constituents as well as objectionable sugars, but may require subsequent addition of sugars to the product if cooking is extended to remove substantially all natural sugars, and if the product is to be roasted under optimum conditions. This sugar leaching is very effective if the water is boiled for about ½ to 1 hour during the soak. Boiling also bleaches the cotyledons to a more attractive light shade. Actually, the time of soaking may vary from about 15 minutes to about 60 minutes or so, with 15–20 minutes being normally sufficient. The cooking time may also be 15–60 minutes, but in actual practice, if the cotyledons are going to be cooked, they may be placed directly into hot cooking water after heat treating since the results of water soak occur simultaneously with the results of cooking. During this water treatment, most effective sugar leaching is obtained with either multiple change of the water on a batch basis, or with continuous exchange of the water on a continuous processing basis, to keep the sugar concentration in the water relatively low. If this sugar concentration in the water is not kept low, the osmotic leaching action of the sugars is lessened considerably. Yet, if the previous heat treatment is properly carried out, the valuable proteins and desirable oils remain intact in the cotyledons and do not leach out as normally occurs when soaking hulled soybeans in water.

The separated cotyledons, when removed from the water bath, are intact, in whole form, with smooth surfaces and an appealing nature, have an excellent open texture, possess the desirable nutritional constituents, and are generally free of the undesirable internal constituents and external components.

According to the method set forth herein, these moist cotyledons are then roasted, either in hot oil or by dry heat, to produce appealing full-fat or oil containing roasted soy nuts which have good chewing characteristics, are tasty, are not bitter, and are highly nutritious. Roasting may be delayed after the water treatment, provided the product is kept moist to prevent dehydration and consequent shrinkage back to the high density product. If this roasting is done rapidly, the swollen cotyledons retain substantially all of their expanded size. The temperature range for roasting is about 250° F. to 600° F. The time of roasting varies somewhat inversely with the temperatures, and being in the range of about 30 minutes to about 5 minutes.

The nuts may have flavors such as spices or the like added before, during, or after roasting.

The nuts can also be converted to a spread by mixing in such ingredients as oils, sugars, salt, flavors, and stabilizers, and grinding the mixture to an appealing soy nut butter. The oil or oils may be any of the common vegetable oils such for example as safflower oil, peanut oil, soybean oil, corn oil, cocoanut oil, or others, or may be animal oils such as butter, tallow, or the like, depending upon the nature desired in the product. The oils may be partially hydrogenated to give a thicker consistency to the spread. The sugar may be of any edible type such as sucrose, lactose, etc. The flavors may be any of the hundreds known and available, including various spices, extracts, etc. Stabilizers, if used, are merely to prevent oxidative rancidity, and therefore may be any of the known edible food grade antioxidants such as butylated hydroxy anisole, or butylated hydroxy toluene, to name only a couple of the many known types of such available. The range of oil to soy nuts may vary within the general range of 20–85 parts by weight of oil and 80–15 parts by weight of soy nuts. The amount of salt and sugar added is to suit taste, i.e. about 0–5 parts by weight of salt and 0–30 parts by weight sugar. In contrast to previous ground soy spread products, the novel spread has a pleasant mouth feel, free of the sandy or grainy texture.

It is to be understood that the novel spread products as described herein may be produced from most any edible, dry heat treated, dehulled cotyledon seed material.

A few illustrative examples of the process are as follows:

EXAMPLE NO. 1

Soybeans are heated with hot air at a temperature of 450° F. for 2½ minutes, causing internal changes and causing the hulls to split perpendicular to the main axis of the cotyledons. The beans, while still hot, are put into a water bath previously heated to near boiling. The water is boiled for 45 minutes and agitated, causing the hulls to fall off the beans and the hypocotyls to be released from the cotyledons, causing the cotyledons to swell and expand, and causing osmotic leaching of the undesirable constituents. The cotyledons are then removed from the water, placed in hot oil at a temperature of 425° F. and roasted for 8 minutes. The product is salted and eaten like nuts.

EXAMPLE NO. 2

Soybeans are treated as in Example No. 1, except that the soybeans are heated with a combustion flame for 2 minutes, and the water is continuously exchanged with fresh boiling water. The removed cotyledons are then mixed with an equal weight of an hydrogenated mixture of half cocoanut oil and half cottonseed oil, 4% by weight sugar, and ½% by weight salt. The mixture is then ground to a pasty spread.

EXAMPLE NO. 3

Soybeans are heated with hot combustion gases at a temperature of 350° F. for 6 minutes. The heated beans are placed directly into water and allowed to soak for 25 minutes, while being agitated. The separated cotyledons are removed from the water and roasted by hot air at a temperature of 325° F. for 15 minutes.

EXAMPLE NO. 4

Garbanzo peas (chick-peas) are heated with hot air at a temperature of 275° F. for 8 minutes. The peas are then placed in water and soaked for 30 minutes. They are then roasted in oil at a temperature of 300° F. 25 minutes.

EXAMPLE NO. 5

The procedures of Example No. 1 are substantially repeated except that the beans are heated with hot air at a temperature of about 425° F. for about 36 seconds. The resulting roasted beans have substantially the same properties as those obtained by the procedures of Example No. 1.

Many other examples could be set forth, but since the noted examples and the teachings herein are sufficient for one having ordinary skill in the art to practice the invention, additional examples would only be superfluous.

It is conceivable that the conceptual method herein can be practiced in various ways within the criteria set forth. Hence, the invention is intended to be limited only to the definitions provided in the attached claims and the reasonable equivalents thereto.

We claim:

1. A method of treating hull enclosed cotyledon seeds comprising the steps of: heating the complete seeds clear through with dry heat using ambient gaseous temperatures of about 175°–500 F., for a period of about 10 seconds to about 60 minutes to obtain sufficient heat input to the exterior and interior of the seeds to cause their hulls to split, to render the proteins insoluble, to render the oils stable against osmotic extraction in water, and to stabilize the cotyledons against disintegration in water; then treating the seeds with water for at least about 15 minutes to separate the cotyledons from the hulls thereof, to cause the cotyledons to controllably and uniformly swell and expand, to extract from the swollen, expanded cotyledons certain objectionable flavor constituents, and to controllably extract undesirable sugar constituents; and then removing the cotyledons from the treatment water.

2. The method in claim 1 including the subsequent step of roasting the expanded cotyledons.

3. The method in claim 1 including the step of boiling the treatment water.

4. The method in claim 1 wherein said water treatment is effected with water having a sufficiently low concentration of leached sugars to permit the osmotic leaching action of the sugars by replacing the water containing extracted constituents by fresh water substantially throughout the water treatment step.

5. The method in claim 1 wherein the cotyledons are separated from both the hypocotyl and the hulls during the water bath treatment.

6. The method in claim 3 including the subsequent step of roasting the swollen expanded cotyledons rapidly to retain their swollen expanded nature.

7. The method in claim 2 including the step of mixing the roasted cotyledons with edible oil, and grinding the mixture to a pasty spread.

8. A method of treating soybeans comprising the steps of: heating the complete beans clear through with dry heat using ambient gases of about 175°–500° F. for a period of about 10 seconds to about 60 minutes to obtain sufficient heat input to the exterior and the interior of the beans to cause their hulls to split, to render the proteins insoluble, to render the oils stable against osmotic extraction in water, and to stabilize the cotyledons against disintegration in water, agitating the heat treated soybeans in water for at least about 15 minutes to separate the cotyledons from the hulls, to cause the cotyledons to controllably and uniformly swell and expand, and to extract from the expanded cotyledons certain objectionable flavor causing constituents and then removing the cotyledons from the treatment water.

9. The method in claim 8 wherein said water is boiled to controllably extract objectionable sugars from the cotyledons, and the water is exchanged with fresh water during the extraction to permit the osmotic leaching action of the sugars from the cotyledons.

10. The method in claim 8 wherein said heat treated and water treated cotyledons are removed from the water and roasted while still moist and swollen.

11. The method in claim 8 wherein the water is boiled to controllably extract objectionable sugars from the cotyledons, and then removing the cotyledons from the treatment water, roasting the cotyledons while still moist and swollen, mixing the roasted cotyledons with an edible oil and grinding the mixture to a pasty spread.

12. A method for producing an edible food spread which comprises mixing together dry heat treated dehulled cotyledon seeds which have been subjected to a water treatment to extract certain objectionable flavor causing constituents and an edible food oil and comminuting the mixture to form a pasty spread.

13. A whole cotyledon product which comprises a dehulled cotyledon having the oil thereof stable against osmotic extraction in water, the cotyledon being stabilized against disintegration in water and having certain objectionable flavor constituents and undesirable sugar constituents extracted therefrom as prepared by the process of claim 1.

14. A pasty spread comprising a mixture of comminuted cotyledons prepared according to the method of claim 1 and an edible oil.

References Cited

UNITED STATES PATENTS

| | | | |
|---|---|---|---|
| 1,189,128 | 6/1916 | Kellogg | 99—98 |
| 3,220,451 | 11/1965 | Bollens et al. | 146—227 |

A. LOUIS MONACELL, Primary Examiner

W. A. SIMONS, Assistant Examiner

U.S. Cl. X.R.

99—99